(12) United States Patent
Kiilerich Pratas et al.

(10) Patent No.: US 12,672,170 B2
(45) Date of Patent: Jun. 30, 2026

(54) MECHANISM FOR SIDELINK TRANSMISSION

(71) Applicant: Nokia Technologies Oy, Espoo (FI)

(72) Inventors: Nuno Manuel Kiilerich Pratas, Aalborg (DK); Tao Tao, Shanghai (CN); Torsten Wildschek, Gloucester (GB); Naizheng Zheng, Beijing (CN)

(73) Assignee: Nokia Technologies Oy, Espoo (FI)

( * ) Notice: Subject to any disclaimer, the term of this patent is extended or adjusted under 35 U.S.C. 154(b) by 479 days.

(21) Appl. No.: 18/553,765

(22) PCT Filed: Apr. 7, 2022

(86) PCT No.: PCT/CN2022/085651
§ 371 (c)(1),
(2) Date: Oct. 3, 2023

(87) PCT Pub. No.: WO2022/214042
PCT Pub. Date: Oct. 13, 2022

(65) Prior Publication Data
US 2024/0188137 A1 Jun. 6, 2024

(30) Foreign Application Priority Data
Apr. 7, 2021 (CN) .......................... 202110370878.4

(51) Int. Cl.
*H04W 74/0816* (2024.01)
*H04W 72/11* (2023.01)
(Continued)

(52) U.S. Cl.
CPC ........ *H04W 74/0816* (2013.01); *H04W 72/11* (2023.01); *H04W 74/0875* (2013.01); *H04W 92/18* (2013.01)

(58) Field of Classification Search
None
See application file for complete search history.

(56) References Cited

U.S. PATENT DOCUMENTS

2018/0070252 A1 3/2018 Gupta et al.
2021/0092783 A1 3/2021 Sun et al.
(Continued)

FOREIGN PATENT DOCUMENTS

CN 109479288 A 3/2019
CN 110832930 A 2/2020
(Continued)

OTHER PUBLICATIONS

Extended European Search Report dated Jan. 14, 2025 for corresponding European Application No. 22784108.7.
(Continued)

*Primary Examiner* — Robert M Morlan
(74) *Attorney, Agent, or Firm* — Robert P. Michal, Esq.; Rimon PC

(57) ABSTRACT

Embodiments of the present disclosure relate to a method, device, apparatus and computer readable medium for sidelink transmission. According to embodiments of the present disclosure, a first device determines a target transmission start position from a set of candidate transmission starting positions in a sidelink slot based on an access level of a sidelink transmission to be performed. The first device performs a LBT before the target transmission starting position. If the LBT is successful, the first device performs the sidelink transmission from the target transmission starting position. In this way, it enables the use on Mode 2 in shared/unlicensed spectrum, while addressing the issues of un-sensed (not detected) SPS transmissions due to LBT failure as well as making mode 2 more robust towards LBT failures due to other coexisting systems.

20 Claims, 13 Drawing Sheets

(51) Int. Cl.
　　*H04W 74/08*　　　　(2009.01)
　　*H04W 92/18*　　　　(2009.01)

(56)　　　　　　References Cited

U.S. PATENT DOCUMENTS

| | | | | |
|---|---|---|---|---|
| 2021/0368541 | A1* | 11/2021 | Hedayat | H04W 74/0816 |
| 2022/0110157 | A1* | 4/2022 | Wu | H04W 74/0808 |
| 2022/0377619 | A1* | 11/2022 | Grant | H04L 5/0041 |

FOREIGN PATENT DOCUMENTS

| | | | |
|---|---|---|---|
| CN | 111034325 | A | 4/2020 |
| CN | 111954181 | A | 11/2020 |
| CN | 112218375 | A | 1/2021 |
| WO | 2019/216607 | A1 | 11/2019 |
| WO | 2020223372 | A1 | 11/2020 |

OTHER PUBLICATIONS

Fujitsu 'Discussion on Basic Resource Allocation Methods for NR-V2X Sidelink Communication' 3GPP TSG RAN WG1 Ad-Hoc Meeting 1901, R1-1900250, 2019, pp. 1-11.
Huawei 'Discussion on NR sidelink resource allocation by NR Uu and LTE Uu' 3GPP TSG RAN WG1 Meeting #94bis, R1-1810143, 2018, pp. 1-9.
"IEEE 802.11", Wikipedia, Retrieved on Oct. 14, 2023, Webpage Available at : https://en.wikipedia.org/wiki/IEEE_802.11.

"3rd Generation Partnership Project; Technical Specification Group Radio Access Network; Physical layer procedures for shared spectrum channel access (Release 16)", 3GPP TS 37.213, V16.4.0, Dec. 2020, pp. 1-26.
"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.
"3rd Generation Partnership Project; Technical Specification Group Radio Access Network; NR; Multiplexing and channel coding (Release 16)", 3GPP TS 38.212, V16.4.0, Dec. 2020, pp. 1-152.
"3rd Generation Partnership Project; Technical Specification Group Radio Access Network; NR; Physical layer procedures for data (Release 16)", 3GPP TS 38.214, V16.4.0, Dec. 2020, pp. 1-169.
International Search Report and Written Opinion received for corresponding Patent Cooperation Treaty Application No. PCT/CN2022/085651, dated Jun. 29, 2022, 9 pages.
"On channel access for autonomous UL access", 3GPP TSG-RAN WG1 Meeting #90, R1-1713861, Agenda item: 5.2.3.3.3, Nokia, Aug. 21-25, 2017, 5 pages.
Office Action issued Feb. 25, 2025 in Chinese Application No. 202110370878.4.
Discussion on Basic Resource Allocation Methods for NR-V2X Sidelink Communication, Fujitsu, «3GPP TSG RAN WG1 Ad-Hoc Meeting Jan. 11, 2019, pp. 1-6.
Office action received for corresponding Chinese Patent Application No. 202110370878.4, dated Sep. 27, 2024, 6 pages of office action and 4 pages of Summary/translation available.
"Channel access mechanism for NR-unlicensed", 3GPP TSG RAN WG1 Meeting #99, R1-1912197, Agenda Item: 7.2.2.2.1, Intel Corporation, Nov. 18-22, 2019, 30 Pages.

* cited by examiner

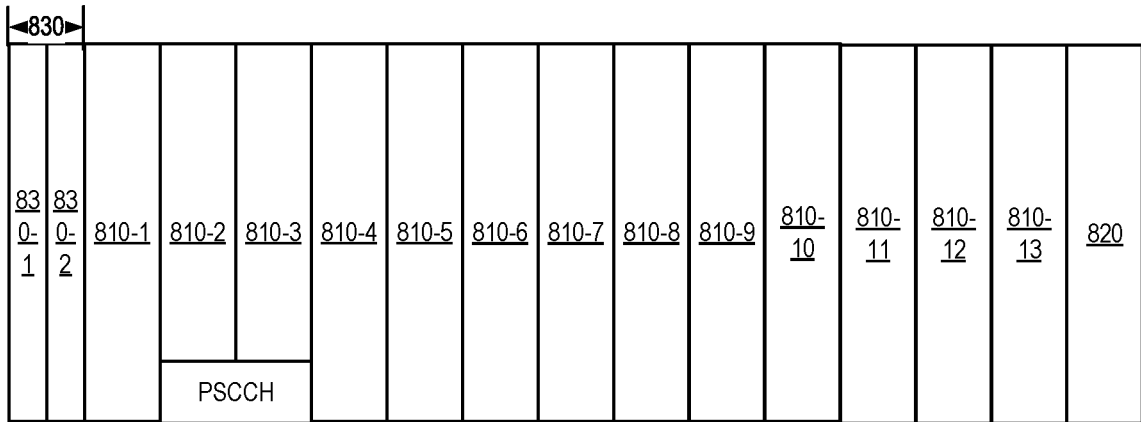
Fig. 8A
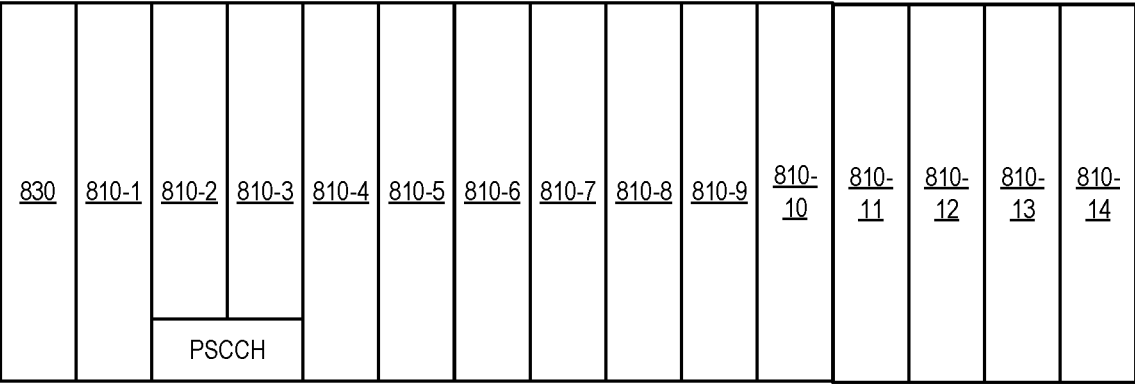
Fig. 8B
Fig. 8C

1300

1310
DETERMINE A TARGET TRANSMISSION STARTING POSITION

1320
PERFORM A LBT

1330
PERFORM THE SIDELINK TRANSMISSION

MECHANISM FOR SIDELINK TRANSMISSION

RELATED APPLICATION

This application claims priority to PCT Application No. PCT/CN2022/085651, filed on Apr. 7, 2022, which claims priority to China Application No. 202110370878.4 filed Apr. 7, 2021, each of which is incorporated herein by reference in its entirety.

FIELD

Embodiments of the present disclosure generally relate to the field of telecommunication and in particular, to methods, devices, apparatuses and computer readable storage medium for sidelink transmission.

BACKGROUND

With developments of communication systems, new technologies have been proposed. Terminal devices can set up a sidelink with each other to allow direction communications between them. For a group of terminal devices, the sidelink slot communication may comprise unicast communication, groupcast communication and broadcast communication. The terminal devices can utilize unlicensed spectrum to perform the sidelink (SL) communication.

SUMMARY

In general, example embodiments of the present disclosure provide a solution for sidelink transmission.

In a first aspect, there is provided a first device. The first device comprises at least one processor; and at least one memory including computer program codes; the at least one memory and the computer program codes are configured to, with the at least one processor, cause the first device to: determine, at a first device, a target transmission starting position from a set of candidate transmission starting positions in a sidelink slot based on an access level of a sidelink transmission to be performed; perform a listen-before-talk on a sidelink channel before the target transmission starting position; and in accordance with a determination that the listen-before-talk is successful, perform the sidelink transmission from the target transmission starting position.

In a second aspect, there is provided a method. The method comprises determining, at a first device, a target transmission starting position from a set of candidate transmission starting positions in a sidelink slot based on an access level of a sidelink transmission to be performed; performing a listen-before-talk on a sidelink channel before the target transmission starting position; and in accordance with a determination that the listen-before-talk is successful, performing the sidelink transmission from the target transmission starting position.

In a third aspect, there is provided an apparatus. The apparatus comprises means for determining, at a first device, a target transmission starting position from a set of candidate transmission starting positions in a sidelink slot based on an access level of a sidelink transmission to be performed; means for performing a listen-before-talk on a sidelink channel before the target transmission starting position; and means for in accordance with a determination that the listen-before-talk is successful, performing the sidelink transmission from the target transmission starting position.

In a fourth aspect, there is provided a computer readable medium. The computer readable medium comprises program instructions for causing an apparatus to perform at least the method according to any one of the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIGS. 8A-8C illustrate schematic diagrams for multiple starting positions according to some example embodiments of the present disclosure;

Throughout the drawings, the same or similar reference numerals represent the same or similar element.

DETAILED DESCRIPTION

Figure 1:
FIG. 1 illustrates a schematic diagram of sidelink operation unlicensed spectrum according to conventional technologies.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. The term "terminal device" refers to any end device that may be capable of wireless communication. In the following description, the terms "terminal device", "terminal", "user equipment" and "UE" may be used interchangeably.

In sub-7 GHz unlicensed bands, the NR coexistence with other systems is ensured via a Listen Before Talking (LBT) channel access mechanism where a UE intending to perform a sidelink transmission needs first to successfully complete an LBT check, before being able to initiate that same transmission. The term "listen-before-talk (LBT)" used herein can refer to a technique used in communications where a device first senses its radio environment before it starts a transmission. For a UE to pass an LBT check then it must observe the channel as available for a number of consecutive Clear Channel Assessment (CCA) slots. In sub-7 GHz the duration of these slots is 9 µs. The UE deems the channel as available in a CCA slot if the measured power (i.e. the collected energy during the CCA slot) is below a regulatory specified threshold (which can depend on the operating band and geographical region).

When a UE initiates the communication (i.e. the UE takes the role of initiating device), then this UE has to acquire the "right" to access the channel for a certain period of time—denoted in the regulations as the Channel Occupancy Time (COT) (for example, the duration 120 shown in FIG. 1)—by applying an "extended" LBT procedure where the channel must be deemed as free for the entire duration of a Contention Window (CW) (shown as the duration 110 in FIG. 1). This "extended" LBT procedure, is commonly known as LBT Category 4 (LBT Cat.4).

Resources for sidelink communications can be scheduled by a network device, which is referred to as mode 1. On the other hand, resources for sidelink communication can also be determined by UE itself, which is referred to as mode 2. Specifically, in mode 2, the SL UEs perform autonomously the resource selection with the aid of a sensing procedure. More specifically, a SL transmitting (TX) UE in NR SL mode 2 first performs a sensing procedure over the configured SL transmission resource pool(s), in order to obtain the knowledge of the reserved resource(s) by other nearby SL TX UE(s). Based on the knowledge obtained from sensing, the SL TX UE may select resource(s) from the available SL resources, accordingly. In order for a SL UE to perform sensing and obtain the necessary information to receive a SL transmission, it needs to decode the sidelink control information (SCI). The term "sidelink" refers to a slink between two terminal devices, which enables device-to-device communications. The term "TX UE" used herein can refer to a UE which can transmit data to another UE when performing sidelink communications with the other UE. The term "receiving (RX) UE" used herein can refer to a UE which can receive data from another UE when performing sidelink communications with the other UE.

As discussed previously, in the new radio (NR) SL resource allocation mode 2, the UE performs autonomous resource selection via the sensing-based collision avoidance mechanism. This collision avoidance mechanism is based on the UE detecting and decoding the sidelink channel information (SCI) of other devices transmissions during the sensing period. Based on these SCIs, the sensing UE can determine which future resources will be used for (i) transmission of the same Transport Block (e.g. both initial and retransmissions) and of (ii) different TB (intended for semi-persistent/periodic traffic, here termed as SPS).

For case (i) a SL device when performing a transmission can indicate up to two additional resources where it will perform a transmission (e.g. to enable blind retransmissions and their soft combining at the SL receiver), where the only restriction is that these resources occur before 31 slots have elapsed from the original transmission. While, for case (ii) the indication of the future resources follows the period indicated in the 1st stage SCI. These two approaches can of course be combined. Additionally, it is possible that aperiodic transmissions which follows the same structure as (i), but the different indicated resources are not necessarily for retransmissions of the original transport block (TB).

The sensing UE by decoding the other UEs' SCIs becomes aware of the future reservations of other UEs and can avoid selecting resources which would collide with them; this decision additionally takes into account the priority of the sensing UE own transmission and the other UEs' transmissions and the respective measured reference signal received power (RSRP).

However, the sensing-based collision avoidance mechanism was not designed while taking into account operation in shared/unlicensed spectrum and the associated need to perform an LBT check each time a UE needs to perform a transmission. Taking as an example a SL semi-persistent scheduling (SPS), if the NR SL has to share the spectrum with Wi-Fi, the two issues will emerge: (1) The Wi-Fi nodes do not decode the SCI and hence do not avoid colliding with the reserved resources (as indicated by the SL device in its previous SPS transmission); (2) If the sidelink device has to perform LBT before its SPS TX, it may have to skip its reserved resource and use an unreserved resource instead, reducing the value of reservation for collision avoidance.

In order to solve at least part of the above and other potential problems, solutions on sidelink transmissions are proposed. According to embodiments of the present disclosure, a first device determines a target transmission start position from a set of candidate transmission starting positions in a sidelink slot based on an access level of a sidelink transmission to be performed. The first device performs a LBT before the target transmission starting position. If the LBT is successful, the first device performs the sidelink transmission from the target transmission starting position. In this way, it enables the use on Mode 2 in shared/unlicensed spectrum, while addressing the issues of unsensed (not detected) SPS transmissions due to LBT failure as well as making mode 2 more robust towards LBT failures due to other coexisting systems.

Figure 2:
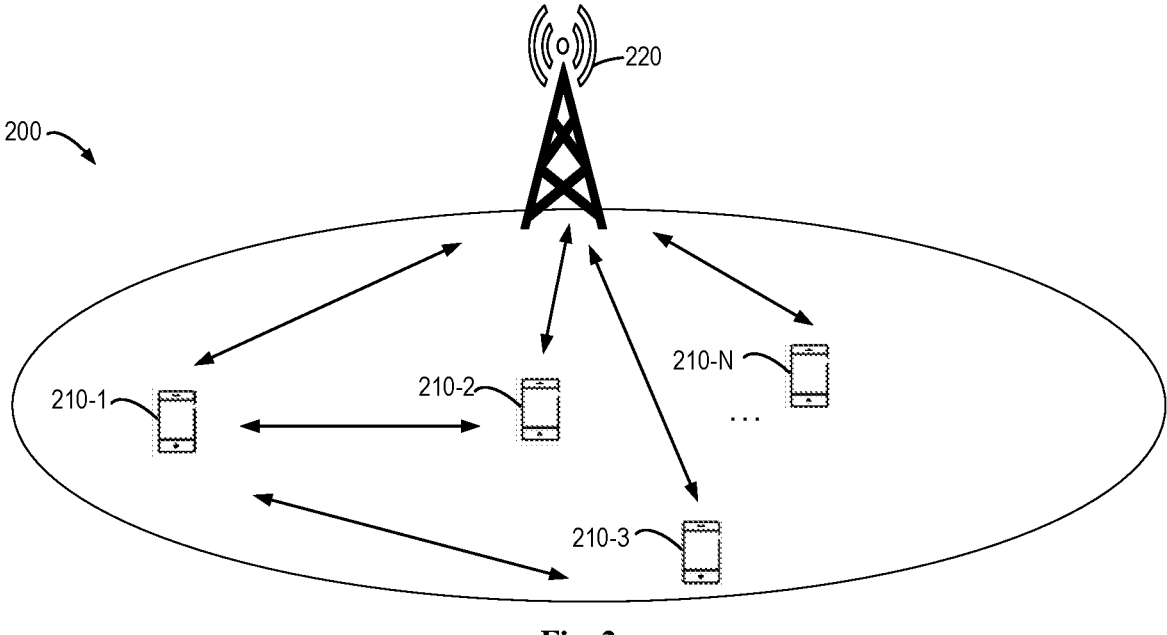
FIG. 2 illustrates an example communication environment in which example embodiments of the present disclosure can be implemented.

FIG. 2 illustrates a schematic diagram of a communication environment 200 in which embodiments of the present disclosure can be implemented. The communication environment 200, which is a part of a communication network, further comprises a device 210-1, a device 210-2, . . . , a device 110-N, which can be collectively referred to as "device(s) 210." The device 210 can be a terminal device. Alternatively, the device 210 can be a vehicle. The communication environment 100 can also comprise a network device 220.

The communication environment 200 may comprise any suitable number of devices. In the communication environment 100, the device 210 and the network device 220 can communicate data and control information to each other. The devices 110 can communicate with each other. A link from the network device 220 to the device 210 is referred to as a downlink (DL), while a link from the device 210 to the network device 220 is referred to as an uplink (UL). A link between two devices 210 is referred to as a sidelink (SL). A link between two vehicles is also referred to as a SL and a link between a terminal device and a vehicle is referred to as a SL as well.

It is to be understood that the number of devices and cells and their connections shown in FIG. 1 is given for the purpose of illustration without suggesting any limitations. The communication environment 100 may include any suitable number of devices and networks adapted for implementing embodiments of the present disclosure.

Communications in the communication environment 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Example embodiments of the present disclosure will be described in detail below with reference to the accompanying drawings. Reference is now made to FIG. 2, which illustrates a signaling flow 200 for paging according to example embodiments of the present disclosure. For the purpose of discussion, the signaling flow 200 will be described with reference to FIG. 1. The signaling flow 200 may involve a first device and a set of second devices which is capable of communicating with the first device. The first device can be any devices capable of sidelink communication. For example, the first device can be a terminal device or a vehicle. The second device can be any suitable devices that are able to communicate with the first device. For example, the second device can be a terminal device or a vehicle. Only for the purpose of illustrations, the device 210-1 is taken as an example of the first device and the device 210-2 is taken as an example of the second device. It should be noted that the second device can comprise any proper devices.

Figure 4:
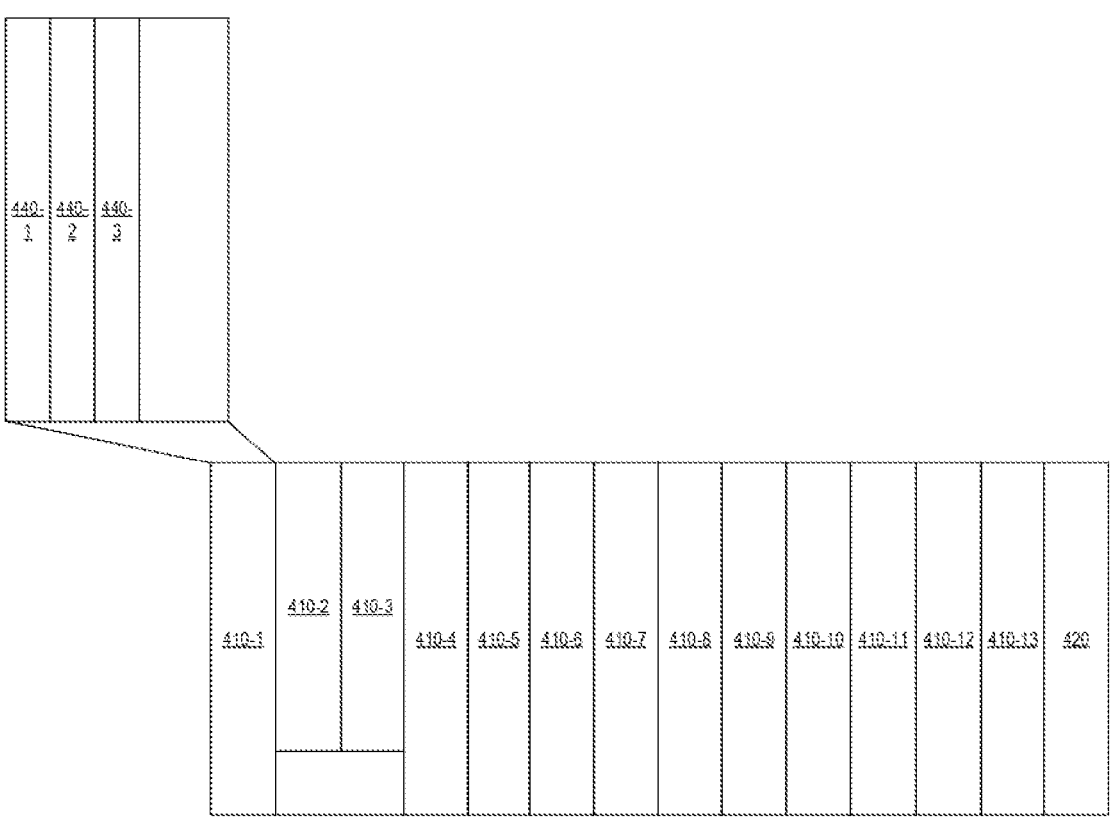
FIG. 4 illustrates a schematic diagram of a sidelink slot according to some example embodiments of the present disclosure.

The device 210-1 (referred to as "first device" hereinafter) can determine 3005 an access level based on its sidelink transmission type. The device 210-1 determines 3010 a target transmission starting position from a set of transmission starting positions based on the access level. In some embodiments, the device 210-1 can determine a target transmission starting position from a plurality of transmission starting positions. The transmission starting position can be selected by the device 210-1 based on the assigned transmission starting position, the LBT Type applied and in the case of LBT Type 1 of the contention window associated with the UE transmission's Channel Access Priority Class. It should be noted that the set of transmission starting positions can comprise any suitable number of transmission starting positions. As shown in FIG. 4, the sidelink slot may comprise 14 symbols, 410-1, 410-2, 410-3, 410-4, 410-5, 410-6, 410-7, 410-8, 410-9, 410-10, 410-11, 410-12, 410-13 and 420. A plurality of transmission starting positions can be configured in the symbol 410-1. For example, a first transmission starting position can be configured within the duration 440-1, a second transmission starting position can be configured within the duration 440-2 and a third transmission starting position can be configured within the duration 440-3.

Table 1 shows an example of mapping between the access levels and the sidelink transmission types. It should be noted that Table 1 is only an example not limitations.

TABLE 1

| Access Level | Transmission Type | Transmission Starting Position |
|---|---|---|
| 1 | Ongoing SL SPS, retransmission of a previous SL SPS transmission | $1^{st}$ transmission starting Position |
| 2 | SL SPS establishment (i.e. first SL SPS transmission), one-time transmission with control signaling, one-time transmission with user plane traffic with high QoS requirements | $2^{nd}$ transmission starting Position |
| 3 | One-time transmission with user plane traffic with more relaxed QoS requirements | $3^{rd}$ transmission starting Position |

Only as an example, if the type of the sidelink transmission is an on-going sidelink semi-persistent scheduling transmission and the access level of the sidelink transmission is access level 1, the device 210-1 can select the first transmission starting position from the set of transmission starting positions. Similarly, if the type of the sidelink transmission is a retransmission of a previous SL SPS transmission and the access level of the sidelink transmission is access level 1, the first transmission starting position can be selected. In this situation, as shown in FIG. 4, the device 210-1 can select the first transmission starting positions within the duration 440-1.

In other embodiments, if the type of the sidelink transmission is a SL SPS establishment (in other words, the first SL SPS transmission) and the access level of the sidelink transmission is access level 2, the device 210-1 can select the second transmission starting position from the set of transmission starting positions. Similarly, if the type of the sidelink transmission is a one-time transmission with control signaling and the access level of the sidelink transmission is access level 2, the second transmission starting position can be selected. Alternatively, if the type of the sidelink transmission is one-time transmission with user plane traffic with high QoS requirements and the access level of the sidelink transmission is access level 2, the device 210-1 can select the second transmission starting position from the set of transmission starting positions. In this situation, as shown in FIG. 4, the device 210-1 can select the second transmission starting positions within the duration 440-2.

In another embodiment, if the type of the sidelink transmission is an one-time transmission with user plane traffic with more relaxed QoS requirements and the access level of the sidelink transmission is access level 3, the device 210-1 can select the second transmission starting position from the set of transmission starting positions. In this situation, as shown in FIG. 4, the device 210-1 can select the third transmission starting positions within the duration 440-3.

In some embodiments, the lower access level (for example, access level 1) can be used for ongoing SL SPSs, retransmission of a previous SL SPS transmission, retransmission of an aperiodic transmission (in a previously indicated resource). In other words, any transmission where at some point in the past there was an indication of the resource to be used in the 1st stage SCI. In addition, a higher access level (for example, access level 1) can be used for transmissions where there was no prior resource indication in the 1st stage SCI associated with a previous transmission.

In another embodiment, a priority field indicated in SCI which corresponds to the priority of an actual transmission provide by the higher layer Table 2 below shows mapping among the access levels, the priority field indicated in the SCI, and the sidelink transmission types. It should be noted that Table 2 is only an example not limitations.

TABLE 2

| Access Level | Priority | Transmission Type | Transmission starting Position |
|---|---|---|---|
| 1a | High | Ongoing SL SPS, retransmission of a | $1^{st}$ Transmission starting Position |
| 1b | Low | previous SL SPS transmission (as per indicated resource in the original transmission) | $2^{nd}$ Transmission starting Position |
| 2a | High | SL SPS establishment (i.e. | $3^{rd}$ Transmission starting Position |
| 2b | Low | first SL SPS transmission), one-time transmission with control signaling, | $4^{th}$ Transmission starting Position |

TABLE 2-continued

| Access Level | Priority | Transmission Type | Transmission starting Position |
|---|---|---|---|
| | | one-time transmission with user plane traffic with high QOS requirements (including indication of resources for retransmission) | |
| 3a | High | One-time transmission with starting Position user plane traffic with more relaxed QoS requirements (including indication of resources for retransmission) | $5^{th}$ Transmission |
| 3b | Low | | $6^{th}$ Transmission starting Position |

Figure 5:
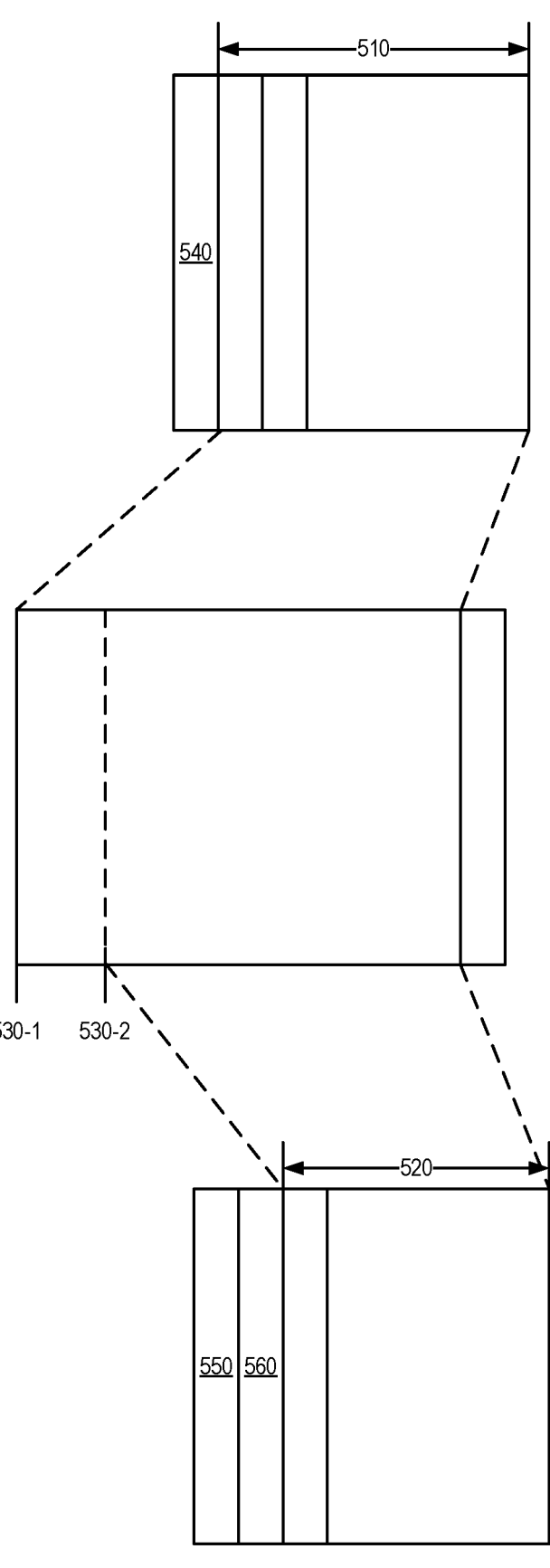
FIG. 5 illustrates a schematic diagram of a sidelink slot cording to some example embodiments of the present disclosure.

FIG. 5 illustrates a schematic diagram of a sidelink slot cording to some example embodiments of the present disclosure. As shown in FIG. 5, there are two transmission starting positions 530-1 and 530-2. The transmission starting position 530-1 has a higher priority than the transmission starting position 530-2. At the transmission starting position 530-1, a failure in the transmission may be caused by another system, for example, Wi-Fi. At the transmission starting point 530-2, a failure in the transmission may be caused by the same system or by the other system.

Only as an example, if the access level of the sidelink transmission 510 is access level 1, the device 210-1 can select the transmission starting position 530-1 as the target transmission starting position for the sidelink transmission 510. The LBT can be performed within the duration 540. The end point of the LBT can coincide with the transmission starting position 530-1.

In addition, if the access level of the sidelink transmission 520 (for example, the access level 2) is larger than the access level of the sidelink transmission 510, the device 210-1 can select the transmission starting position 530-2 as the target transmission starting position for the sidelink transmission 510. The LBT can be performed within the duration 560. The end point of the LBT can coincide with the transmission starting position 530-2. In some embodiments, the LBT can be completed on the target transmission starting position. Alternatively, the LBT can be completed before the target transmission starting position. As shown in FIG. 5, there is no transmission in the symbol 550.

The device 210-1 performs 3015 a LBT on a sidelink channel before the target transmission starting position. The LBT can comprise any channel access operation related to the LBT. In some embodiments, the device 210-1 can determine the target transmission starting position from a plurality of transmission starting positions based on the target transmission starting position. For example, the LBT end position may coincide with the target transmission starting position.

For the device 210-1 to pass an LBT check, the device 210-1 should observe the channel as available for a number of consecutive Clear Channel Assessment (CCA) slots. In sub-7 GHz the duration of these slots is 9 ρs. The device 210-1 deems the channel as available in a CCA slot if the measured power (i.e. the collected energy during the CCA slot) is below a regulatory specified threshold (which can depend on the operating band and geographical region). The duration of both the COT and CW depends on the Channel Access Priority Class (CAPC) associated with the UE's traffic, as shown in Table 3. Control plane traffic (such as PSCCH) is transmitted with p=1, while user plane traffic has p>1.

TABLE 3

| Channel Access Priority Class (p) | $m_p$ | $CW_{min, p}$ | $CW_{max, p}$ | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:

For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:

When $T_{ulm\ cot, p}$ = 6 ms it may be increased to 8 ms by inserting one or more gaps. The minimum duration of a gap shall be 100 us. The maximum duration before including any such gap shall be 6 ms.

Figure 6:
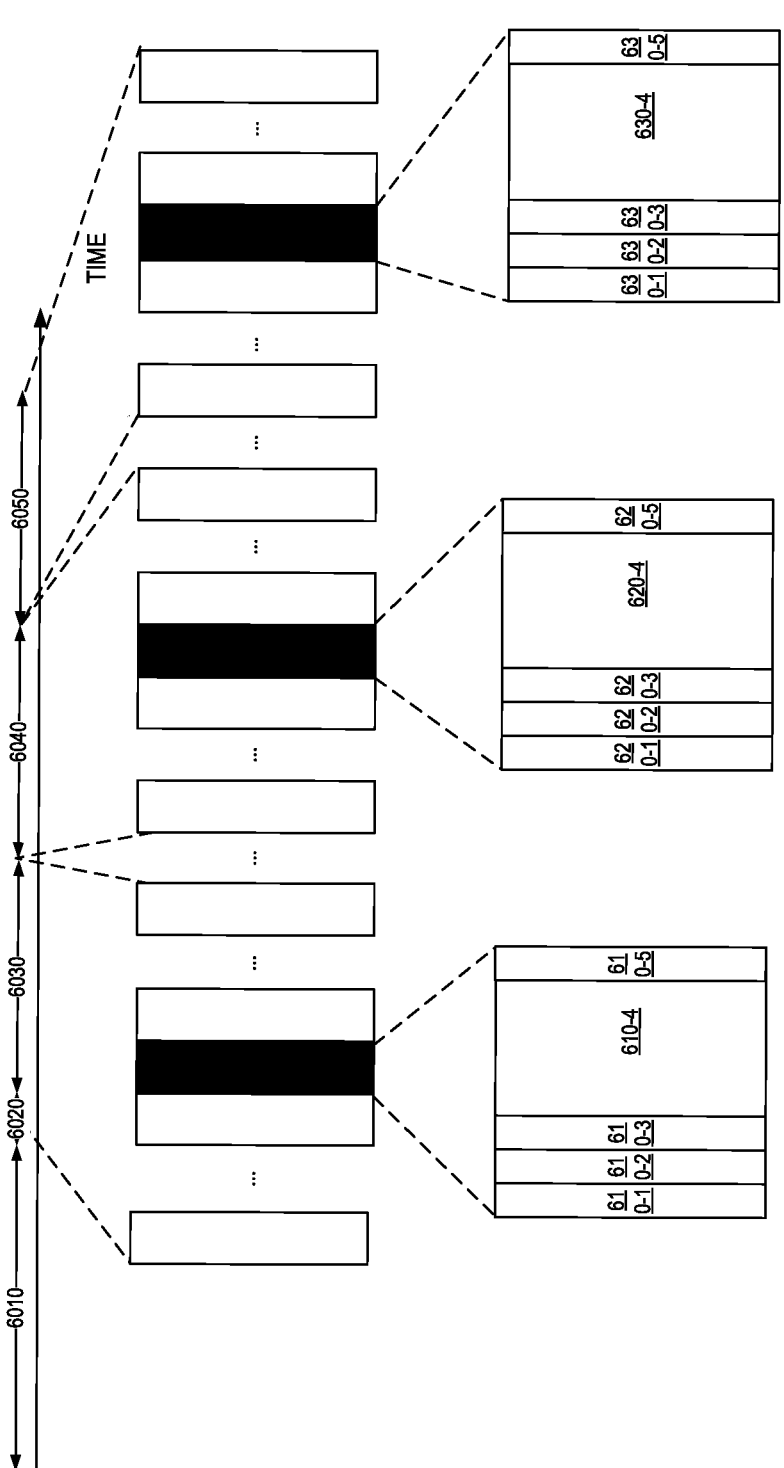
FIG. 6 illustrates a schematic diagram for selecting transmissions according to some example embodiments of the present disclosure.

As shown in FIG. 6, the device 210-1 can perform sensing to identify which resources are available for its periodic transmission during a sensing period 6010. The device 210-1 can select which resource to use for its future periodic transmission with the duration 6020. The device 210-1 can perform its first transmission within the period 6030. For example, there is not transmission in the symbol 610-1. The device 210-1 can perform LBT within the symbol 610-2. The device 210-1 can perform automatic gain control (AGC) in the symbol 610-3 and transmit data or control information within the duration 610-4. There is also a guard symbol 610-5.

Further, the device 210-1 can perform its second transmission within the period 6040. The device 210-1 can perform LBT within the symbol 620-1. The device 210-1 can perform automatic gain control (AGC) in the symbols 620-2 and 620-3 and transmit data or control information within the duration 620-4. There is also a guard symbol 610-5.

Moreover, the device 210-1 can perform its third transmission within the period 6040. The device 210-1 can perform LBT within the symbol 630-1. The device 210-1 can perform automatic gain control (AGC) in the symbols 630-2 and 630-3 and transmit data or control information within the duration 630-4. There is also a guard symbol 630-5.

Figure 3:
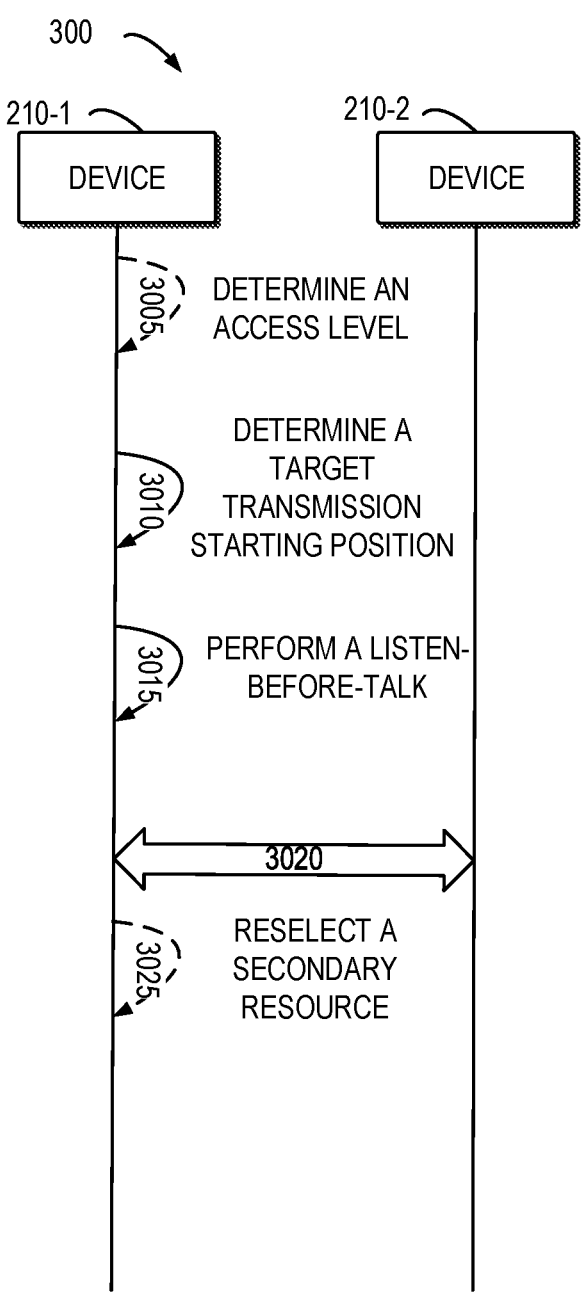
FIG. 3 illustrates a signaling flow for a sidelink transmission in an unlicensed carrier according to some example embodiments of the present disclosure.

Referring back to FIG. 3, the device 210-1 performs 3020 the sidelink transmission if the LBT is successful. In some embodiments, the device 210-1 can perform the sidelink transmission towards a receiving device (for example, the device 210-2). Alternatively, the device 210-1 can perform the sidlink transmission towards a group of devices. For example, the sidelink transmission can be group-casted. In other embodiments, the device 210-1 can perform the sidlink transmission towards all devices. For example, the sidelink transmission can be broadcasted. Only for the purpose of illustrations, FIGS. 7A-12C are described with a reference to a case where two transmission starting positions are configured. It should be noted that any suitable number of transmission starting positions can be configured.

Figure 7A:
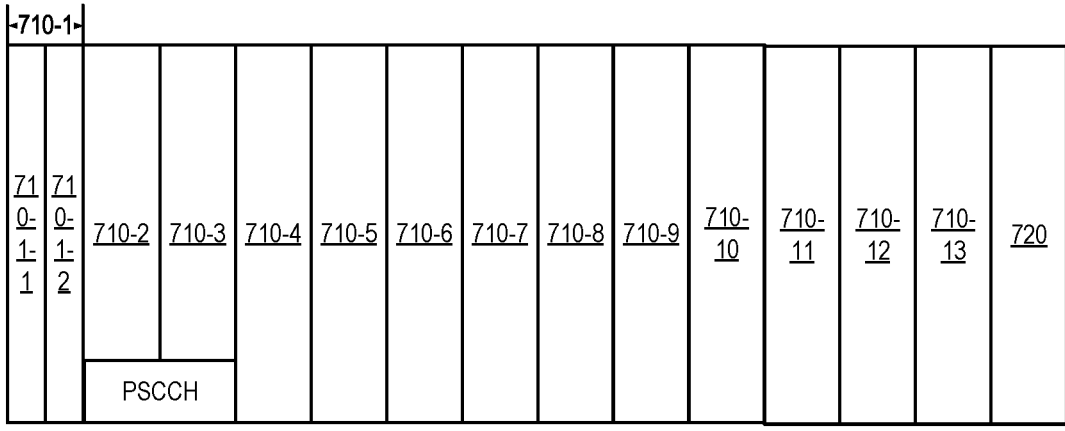
FIGS. 7A-7C illustrate schematic diagrams for multiple starting positions according to some example embodiments of the present disclosure.
Figure 7B:
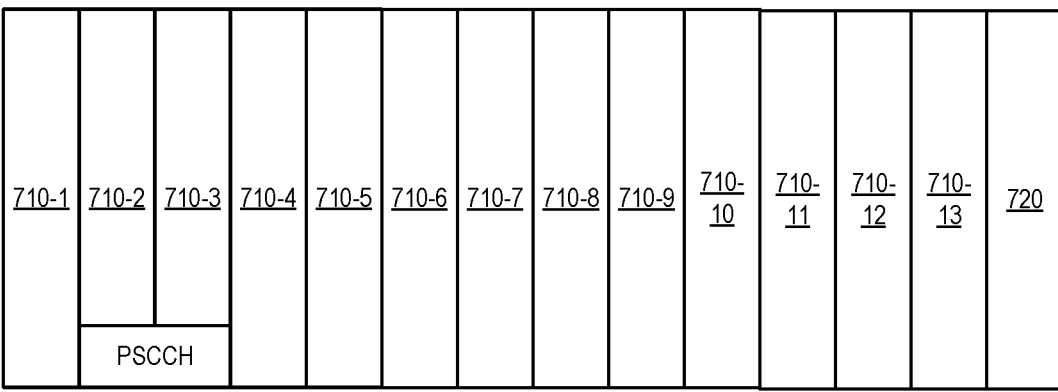
Figure 7C:
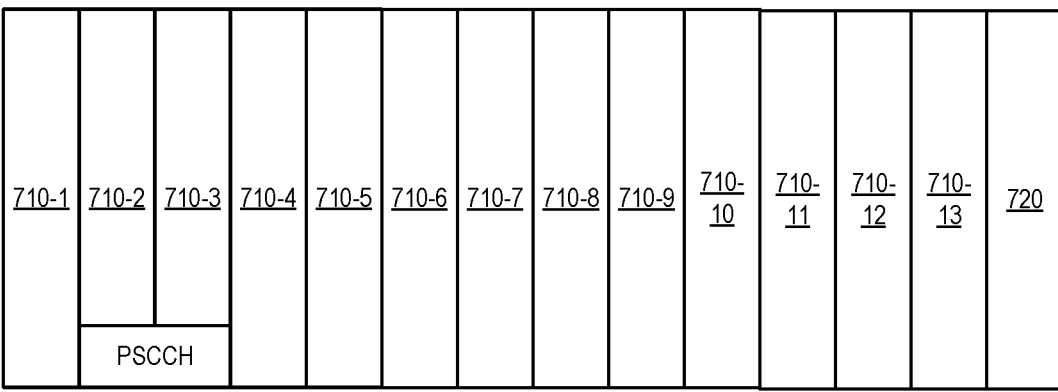

For example, as shown in FIGS. 7A-7C, two transmission starting positions can be configured within the symbol 710-1. The first transmission starting position in time can has a higher priority than the second transmission starting position. The symbols 710-2, 710-3, 710-5, 710-6, 710-7, 710-8, 710-10, 710-11, 710-12, 710-13 can be used for physical sidelink shared channel (PSSCH). The symbols 710-2 and 710-3 can also be used for physical sidelink control channel (PSDCH). The symbols 710-4 and 710-9 can be used for transmitting demodulation reference signals (DMRS). The symbol 720 is the guard symbol.

As shown in FIG. 7B, if the device 210-1 selects the first transmission starting position of the two transmission starting positions, the LBT may be completed at or before the first transmission starting position. For example, the LBT should be completed before the symbol 710-1. The device 210-1 can transmit the AGC symbol in the symbol 710-1. The device 210-1 can transmit at least one of data or control information from the symbol 710-2.

As shown in FIG. 7C, if the device 210-1 selects the second transmission starting position of the two transmission starting positions, the LBT may be completed at or before the second transmission starting position. For example, the device 210-1 can perform the LBT within the duration 710-1-1. If the device 210-1 succeeds in the LBT, the device 210-1 may transmit the remaining of the duration 710-1-2 a CP of the sidelink transmission (in connection with symbol 710-2) to fill the gap between starting position and the starting symbol boundary of symbol 710-2.

As another embodiment, a first transmission starting position (high priority starting point and low priority starting point) can be configured within the guard symbol of the previous sidelink slot and a second transmission starting position can be configured within the first symbol of the current sidelink slot. For example, as shown in FIGS. 8A-8C, the first transmission starting position can be configured in the symbol 830 which is before the current SL slot and the second transmission starting position can be configured in the symbol 810-1. The first transmission starting position in time can has a higher priority than the second transmission starting position. The symbols 810-2, 810-3, 810-5, 810-6, 810-7, 810-8, 810-10, 810-11, 8710-12, 810-13 can be used for pPSSCH. The symbols 810-2 and 810-3 can also be used for PSDCH. The symbols 810-4 and 810-9 can be used for transmitting demodulation reference signals (DMRS). The symbol 820 is the guard symbol. PSSCH and PSCCH start from the symbol 810-2.

As shown in FIG. 8B, if the device 210-1 selects the first transmission starting position of the two transmission starting positions, the LBT may be completed at or before the first transmission starting position. For example, the LBT should be completed within the symbol 830-1. If the LBT is successful the device 210-1 can transmit the AGC in the duration 830-2 and the symbol 810-1. The device 210-1 can transmit at least one of data or control information from the symbol 810-2.

As shown in FIG. 8C, if the device 210-1 selects the second transmission starting position of the two transmission starting positions, the LBT may be completed at or before the second transmission starting position. For example, the device 210-1 can perform the LBT within the duration 830-2. If the device 210-1 succeeds in the LBT, the device 210-1 may transmit the AGC in the symbol 810-1. The device 210-1 may transmit at least one of: data or control information from the symbol 810-2.

Figure 9A:
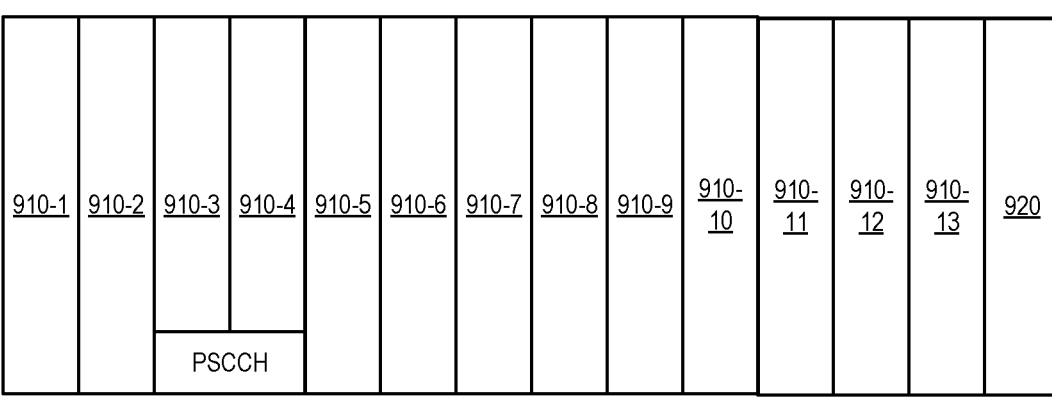
FIGS. 9A-9C illustrate schematic diagrams for multiple starting positions according to some example embodiments of the present disclosure.
Figure 9B:
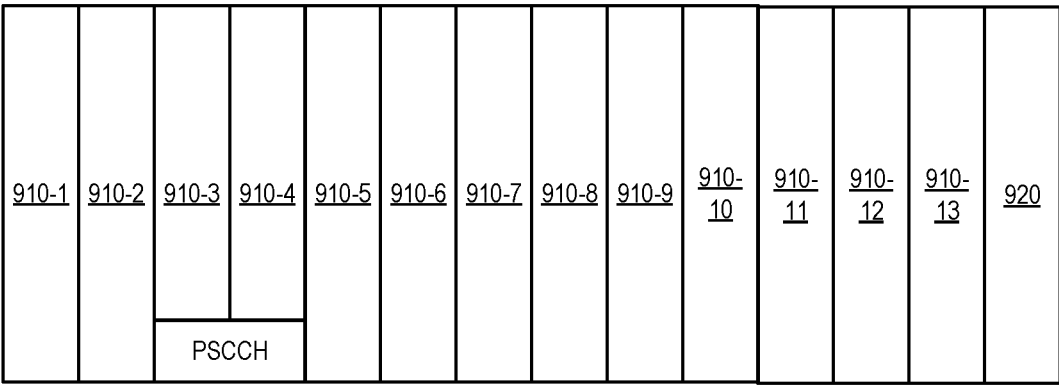
Figure 9C:
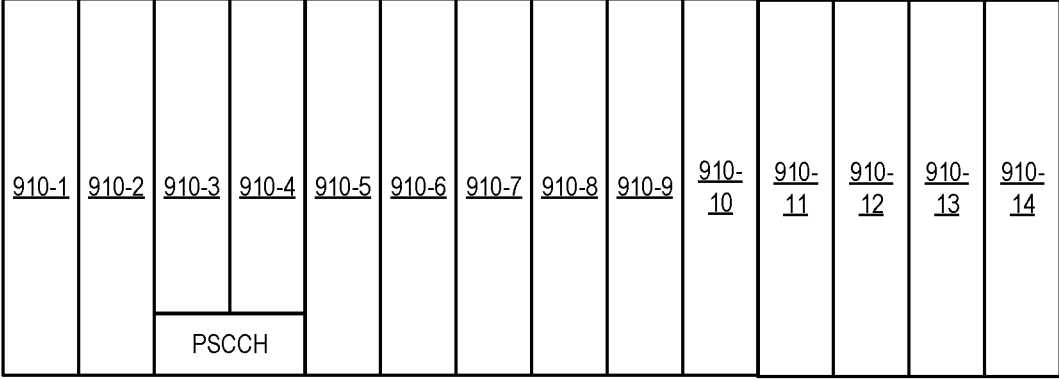

In other embodiments, for example, as shown in FIGS. 9A-9C, a first transmission starting position can be configured in the symbol 910-1 and a second transmission starting position can be configured in the symbol 910-2. The first transmission starting position in time can has a higher priority than the second transmission starting position. The symbols 910-3, 910-5, 910-6, 910-7, 910-8, 910-10, 910-11, 910-12, 910-13 can be used for physical sidelink shared channel (PSSCH). The symbols 910-4 and 910-9 can be used for transmitting demodulation reference signals (DMRS). The symbol 920 is the guard symbol. PSSCH and PSCCH start from the symbol 910-3.

As shown in FIG. 9B, if the device 210-1 selects the first transmission starting position of the two transmission starting positions, the LBT may be completed at or before the first transmission starting position. For example, the LBT should be completed before the symbol 910-1. If the device 210-1 succeeds in the LBT, the device 210-1 can transmit the AGC in the symbols 910-1 and 910-2. The device 210-1 can transmit at least one of data or control information from the symbol 910-3.

As shown in FIG. 9C, if the device 210-1 selects the second transmission starting position of the two transmission starting positions, the LBT may be completed at or before the second transmission starting position. For example, the device 210-1 can perform the LBT within the symbol 910-1 and the LBT should be completed before the symbol 910-2, if the device 210-1 succeeds in the LBT, there is no transmission in the symbol 910-1 and the device 210-1 may transmit the AGC symbol in the symbol 910-2. The device 210-1 may transmit at least one of: data or control information from the symbol 910-3.

Figure 10A:
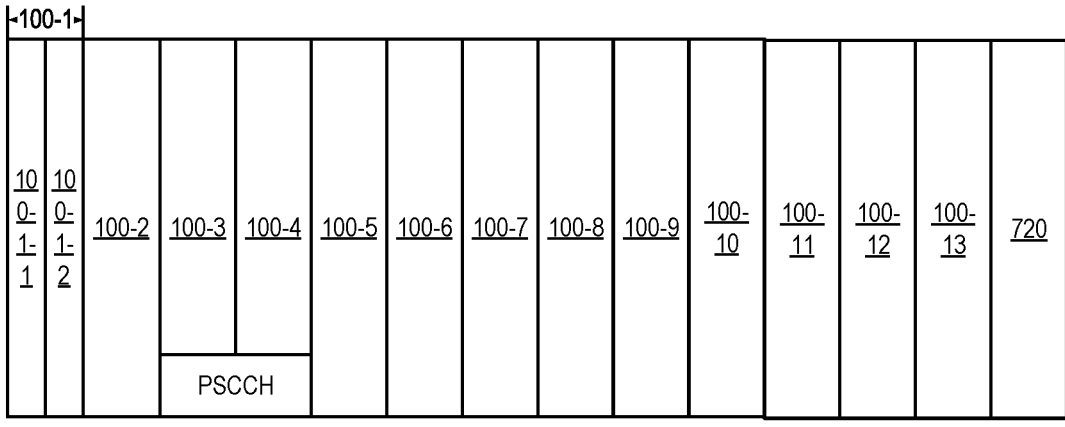
FIGS. 10A-10C illustrate schematic diagrams for multiple starting positions according to some example embodiments of the present disclosure.
Figure 10B:
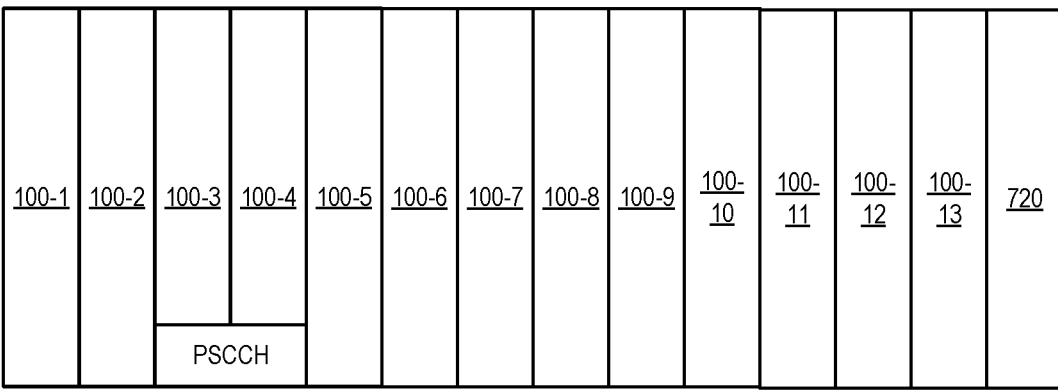
Figure 10C:
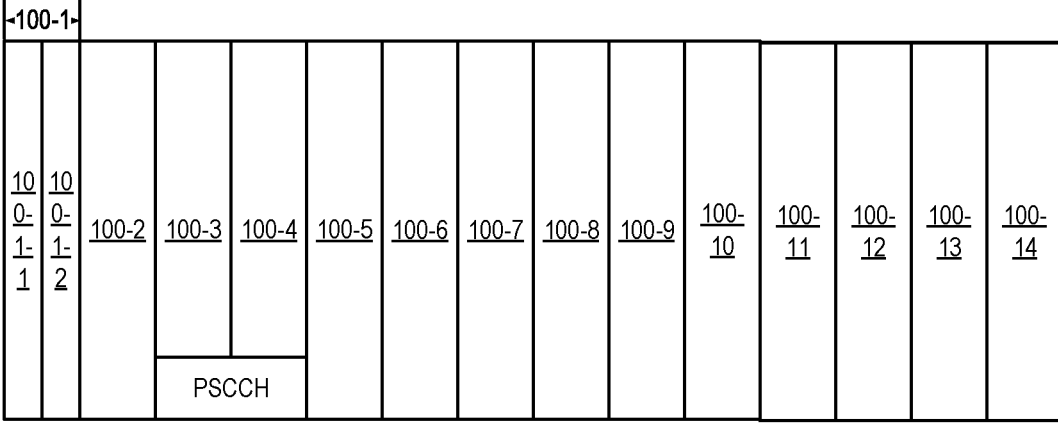

Alternatively, as shown in FIGS. 10A-10C, two transmission starting positions can be configured within in the symbol 100-1. The first transmission starting position in time can has a higher priority than the second transmission starting position. The symbols 100-3, 100-5, 100-6, 100-7, 100-8, 100-10, 100-11, 100-12, 100-13 can be used for physical sidelink shared channel (PSSCH). The symbols 100-4 and 100-9 can be used for transmitting demodulation reference signals (DMRS). The symbol 120 is the guard symbol. PSSCH and PSCCH start from the symbol 100-3.

As shown in FIG. 10B, if the device 210-1 selects the first transmission starting position of the two transmission starting positions, the LBT may be completed at or before the first transmission starting position. For example, the LBT should be completed before the symbol 100-1. If the device 210-1 succeeds in the LBT, the device 210-1 can transmit the AGC in the symbols 100-1 and 100-2. The device 210-1 can transmit at least one of data or control information from the symbol 100-3.

As shown in FIG. 10C, if the device 210-1 selects the second transmission starting position of the two transmission starting positions, the LBT may be completed at or before the second transmission starting position. For example, the device 210-1 can perform the LBT within the duration 100-1-1. If the device 210-1 succeeds in the LBT, the device 210-1 may transmit the AGC in the duration

100-1-2 in the symbol 100-1 and the symbol 100-2. The device 210-1 may transmit at least one of: data or control information from the symbol 100-3.

Figure 11A:
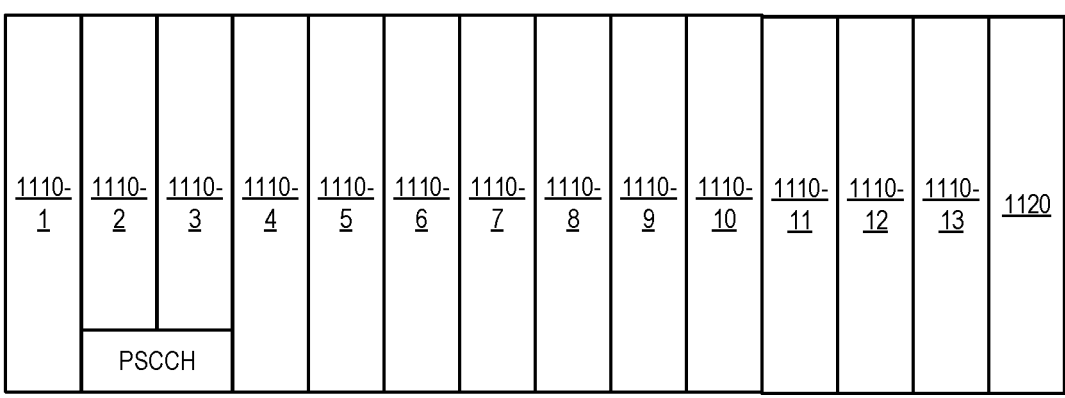
FIGS. 11A-11C illustrate schematic diagrams for multiple starting positions according to some example embodiments of the present disclosure.
Figure 11B:
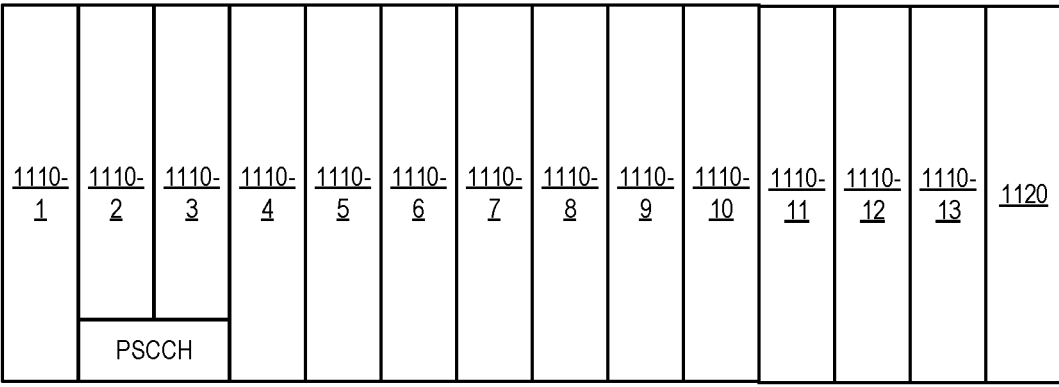
Figure 11C:
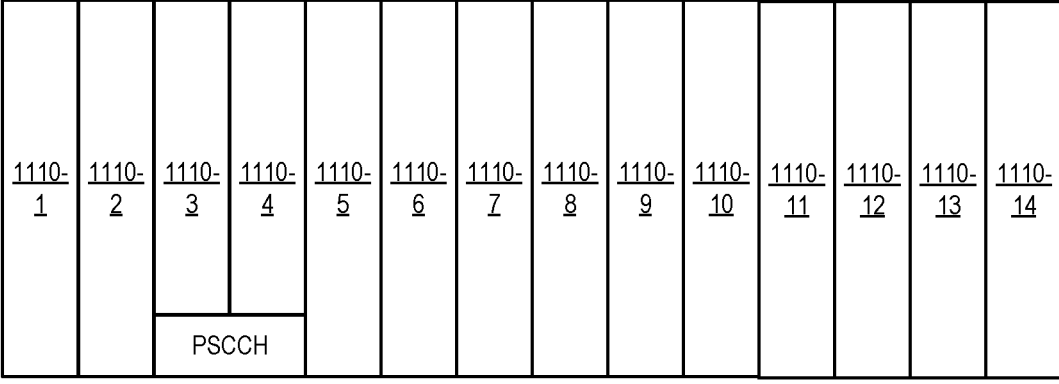

In other embodiments, for example, as shown in FIGS. 11A-11C, a first transmission starting position can be configured in the symbol 1110-1 and a second transmission starting position can be configured in the symbol 1110-2. The first transmission starting position in time can has a higher priority than the second transmission starting position.

As shown in FIG. 11B, if the device 210-1 selects the first transmission starting position of the two transmission starting positions, the LBT may be completed at or before the first transmission starting position. For example, the LBT should be completed before the symbol 1110-1. If the device 210-1 succeeds in the LBT, the device 210-1 can transmit the AGC in the symbol 1110-1. The device 210-1 can transmit at least one of data or control information from the symbol 1110-2. The symbols 1110-2, 1110-3, 1110-5, 1110-6, 1110-7, 1110-8, 1110-10, 1110-11, and 1110-12 can be used for physical sidelink shared channel (PSSCH). The symbols 1110-4 and 1110-9 can be used for transmitting demodulation reference signals (DMRS). There is not transmission in the symbol 1110-13. The symbol 1120 is the guard symbol. PSSCH and PSCCH start from the symbol 1110-2.

As shown in FIG. 11C, if the device 210-1 selects the second transmission starting position of the two transmission starting positions, the LBT may be completed at or before the second transmission starting position. For example, the device 210-1 can perform the LBT within the symbol 1110-1 and the LBT should be completed before the symbol 1110-2. If the device 210-1 succeeds in the LBT, there is no transmission in the symbol 1110-1 and the device 210-1 may transmit the AGC in the symbol 1110-2. The device 210-1 may transmit at least one of: data or control information from the symbol 1110-3. The symbols 1110-3, 1110-4, 1110-6, 1110-7, 1110-8, 1110-9, 1110-11, 1110-12, and 1110-13 can be used for physical sidelink shared channel (PSSCH). The symbols 1110-5 and 1110-10 can be used for transmitting demodulation reference signals (DMRS). There is not transmission in the symbol 1110-13. The symbol 1120 is the guard symbol. PSSCH and PSCCH start from the symbol 1110-3.

Figure 12A:
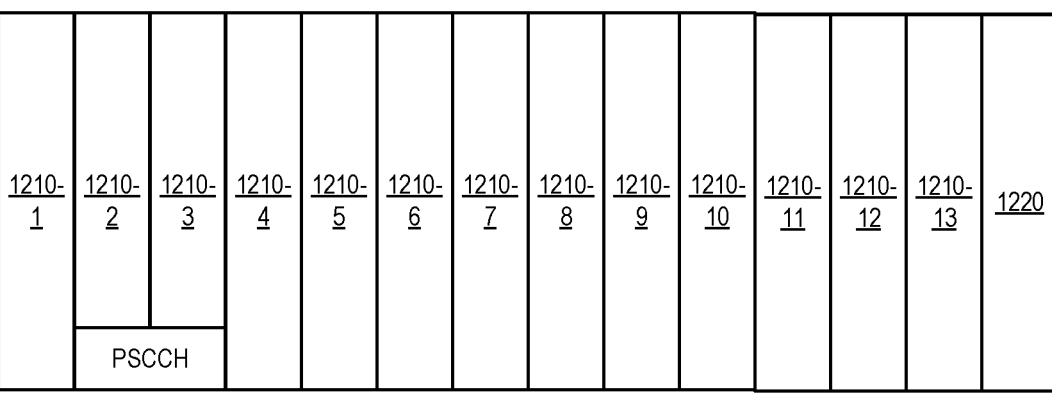
FIGS. 12A-12C illustrate schematic diagrams for multiple starting positions according to some example embodiments of the present disclosure.
Figure 12B:
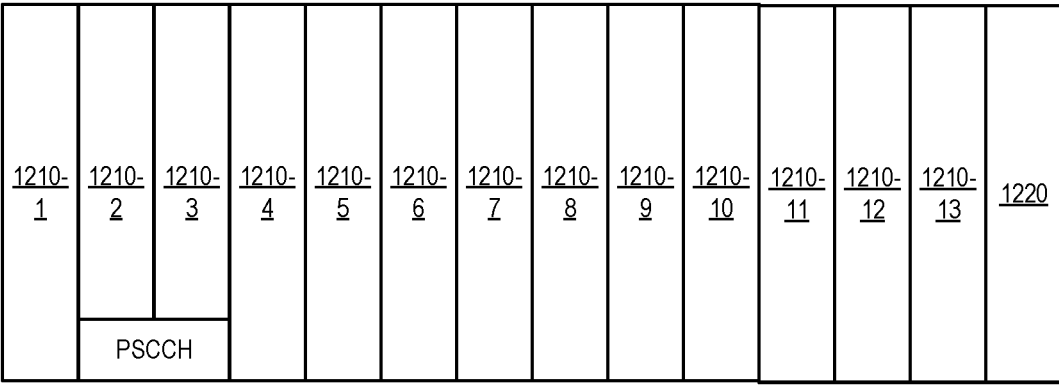
Figure 12C:
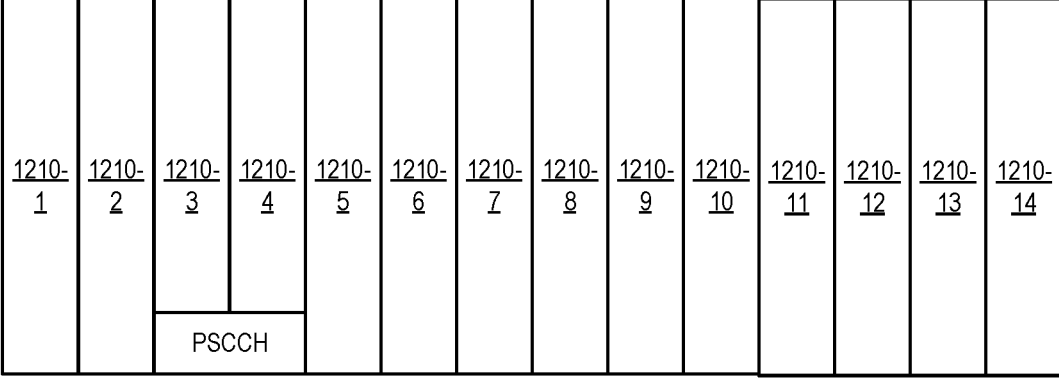

In some embodiments, for example, as shown in FIGS. 12A-12C, a first transmission starting position can be configured in the symbol 1210-1 and a second transmission starting position can be configured in the symbol 1210-2. The first transmission starting position in time can has a higher priority than the second transmission starting position.

As shown in FIG. 12B, if the device 210-1 selects the first transmission starting position of the two transmission starting positions, the LBT may be completed at or before the first transmission starting position. For example, the LBT should be completed before the symbol 1210-1. If the device 210-1 succeeds in the LBT, the device 210-1 can transmit the AGC in the symbol 1210-1. The device 210-1 can transmit at least one of data or control information from the symbol 1210-2. The symbols 1210-2, 1210-3, 1210-5, 1210-6, 1210-7, 1210-8, 1210-10, 1210-11, 1210-12 and 1210-13 can be used for physical sidelink shared channel (PSSCH). The symbols 1210-4 and 1210-9 can be used for transmitting demodulation reference signals (DMRS). The symbol 1220 is the guard symbol. PSSCH and PSCCH start from the symbol 1210-2.

As shown in FIG. 12, if the device 210-1 selects the second transmission starting position of the two transmission starting positions, the LBT may be completed at or before the second transmission starting position. For example, the device 210-1 can perform the LBT within the symbol 1210-1 and the LBT should be completed before the symbol 1210-2. If the device 210-1 succeeds in the LBT, there is no transmission in the symbol 1210-1 and the device 210-1 may transmit the AGC in the symbol 1210-2. The device 210-1 may transmit at least one of: data or control information from the symbol 1210-3. The symbols 1210-3, 1210-4, 1210-6, 1210-7, 1210-8, 1210-9, 1210-11, 1210-12, and 1210-13 can be used for physical sidelink shared channel (PSSCH). The symbols 1210-5 and 1210-10 can be used for transmitting demodulation reference signals (DMRS). There is mo transmission in the symbol 1210-13. The symbol 1220 is the guard symbol. PSSCH and PSCCH start from the symbol 1210-3.

Alternatively, in order to cope with any eventual LBT check failure (either due to same system LBT pre-emption or another system), primary and secondary resources can be selected. In this case, the device 210-1 can a set of primary resources and a set of secondary resources during the sensing period.

If the sidelink transmission is the first SPS transmission, the device 210-1 can select the target transmission starting position with a lower priority. In the subsequent transmission of the sidelink transmission, the device 210-1 can select the target transmission starting position with a higher priority.

In some embodiments, if the device 210-1 is unable to access the channel to transmit the sidelink transmission, the device 210-1 can reselect 3025 a secondary resource and can attempt access in the secondary resources. In addition, if the sidelink transmission is still unsuccessful or the sidelink transmission is not successful for M tries (both primary and secondary resources), the UE restarts the resource reselection (sensing) and re-attempts a new access.

In an alternative embodiment, the device 210-1 can select different starting positions in the primary and secondary resources. For example, in the primary resource the device 210-1 can the lower priority starting position (e.g. for the first SPS transmission) while in the secondary resource the device 210-1 selects the higher priority starting position.

In SL mode 2, as previously discussed, an earlier transmission can indicate in its SCI where the resource of the next transmission of the device 210-1 will take place, establishing a resource reservation for the future transmission of that same device 210-1. When other devices perform the sensing, these devices become aware that there will be another transmission from the same device in a specific resource in the future. This is the principle behind the establishment of the SPS in Mode 2 (and also of the aperiodic transmissions with resource reservation for resources within the next 31 slots).

However, in case the earlier transmission was dropped (e.g. due to causes other than LBT, such as congestion control, higher priority UL Tx, among other causes), then the next resource where the device would perform its next transmission (a new transmission or a retransmission of the original payload, which is indicated via the "New Data Indicator" flag in the 2nd stage SCI) is no longer reserved. In other words, the devices performing the sensing do not receive the earlier transmission of the device, and as such cannot know that the device intends to transmit in a specific resource.

In case a retransmission of the device is occurring in unreserved resources, then it should perform its transmission in the later starting position, while a retransmission of the device on a reserved resource can use the earlier starting position.

The cause for blocking the earlier transmission, can affect the starting position when the device performs a new transmission. For example, blocking due to LBT in previous resource allows the new transmission to use the earlier starting position in the next resource, while in the case the blocking was due to reasons other than LBT then the device should use the later starting position in the next resource.

According to embodiments of the present disclosure, it enables the use on Mode 2 in shared/unlicensed spectrum, while addressing the issues of un-sensed (not detected) SPS transmissions due to LBT failure as well as making mode 2 more robust towards LBT failures due to other coexisting systems.

Figure 13:
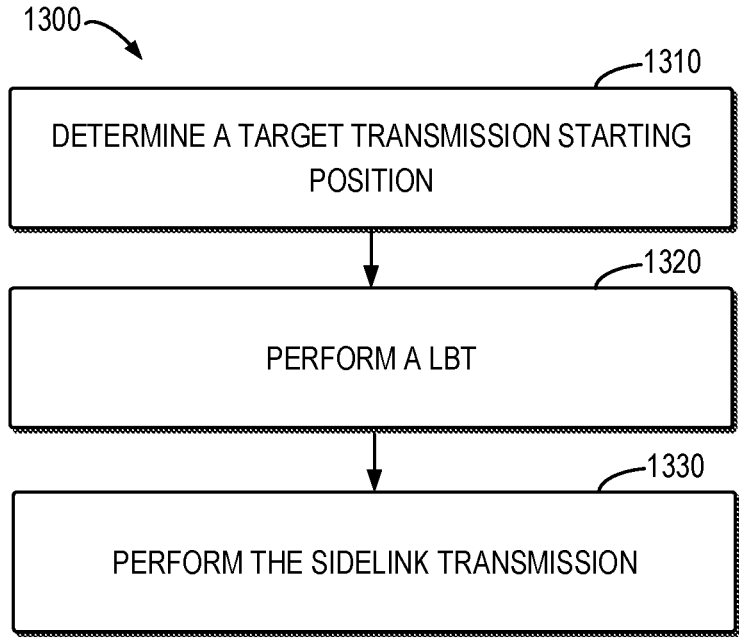
FIG. 13 illustrates a flowchart of a method implemented at a first apparatus according to some example embodiments of the present disclosure.

FIG. 13 shows a flowchart of an example method 1300 implemented at a first device in accordance with some example embodiments of the present disclosure. For the purpose of discussion, the method 1300 will be described from the perspective of the device 210 as shown in FIG. 1. Only as an example, the first device is referred to as the device 210-1.

At block 1310, the device 210-1 determines a target transmission starting position from a set of candidate transmission starting positions in a sidelink slot based on an access level of a sidelink transmission to be performed. In some embodiments, the device 210-1 can determine the access level based on a transmission type of the sidelink transmission. The device 210-1 can select the target transmission starting position from the set of candidate transmission starting positions based on the access level.

In an example embodiment, if the transmission type of the sidelink transmission is an on-going sidelink semi-persistent scheduling transmission, the device 210-1 can determine that the access level has a first priority higher than a first priority threshold. Alternatively or in addition, if the transmission type of the sidelink transmission is a retransmission indicated in a previous sidelink transmission, the device 210-1 can determine that the access level has a first priority higher than a first priority threshold. In this case, the device 210-1 can select the target transmission starting position that is an earliest one in time in the set of candidate transmission starting positions.

In another embodiment, if the transmission type of the sidelink transmission is an on-going sidelink semi-persistent scheduling transmission with a fourth priority lower than a fourth priority threshold, the device 210-1 can determine that the access level has a second priority lower than a first priority threshold and higher than a second priority threshold. Alternatively or in addition, if the transmission type of the sidelink transmission is a retransmission indicated in a previous sidelink transmission with a fifth priority lower than a fifth priority threshold, the device 210-1 can determine that the access level has a first priority higher than a first priority threshold. In some embodiments, the device 210-1 can determine that the access level has a first priority higher than a first priority threshold, if the transmission type of the sidelink transmission is one of the following a sidelink semi-persistent scheduling establishment, one time transmission with control signaling, or one-time transmission with a requirement of quality of service higher than a threshold. In this case, the device 210-1 can select the target transmission starting position that is later in time than the earliest one in time in the set of candidate transmission starting positions.

In a yet embodiment, if the transmission type of the sidelink transmission is an on-going sidelink semi-persistent scheduling transmission with a fourth priority lower than a fourth priority threshold, the device 210-1 can determine that the access level that has a third priority lower than a third priority threshold. Alternatively or in addition, if the transmission type of the sidelink transmission is a retransmission indicated in a previous sidelink transmission with a fifth priority lower than a fifth priority threshold, the device 210-1 can determine that the access level that has a third priority lower than a third priority threshold. In an alternative embodiment, if the transmission type of the sidelink transmission is an one-time transmission with a requirement of quality of service lower than a threshold, the device 210-1 can determine that the access level that has a third priority lower than a third priority threshold. In this case, the device 210-1 can select the target transmission starting position that is later in time than the earliest one in time in the set of candidate transmission starting positions in time.

At block 1320, the device 210-1 performs a LBT on a sidelink channel before the target transmission starting position. In some embodiments, the device 210-1 can perform the LBT within a first symbol in the sidelink slot.

At block 1330, the device 210-1 performs the sidelink transmission from the target transmission starting position if the LBT is successful. For example, if the LBT is performed within the first symbol in the sidelink slot, the device 210-1 can transmit a cyclic prefix of the sidelink transmission in a remaining portion of the first symbol and transmit at least one of data or control information for the sidelink transmission from a second symbol in the sidelink slot.

Alternatively, if the device 210-1 performs the LBT within a guard symbol of a sidelink slot prior to the sidelink slot, the device 210-1 can transmit an automatic gain control symbol after an end position of the listen-before-talk. The device 210-1 can transmit at least one of data or control information for the sidelink transmission from a second symbol in the sidelink slot.

As another embodiment, if the device 210-1 performs the LBT within a first symbol in the sidelink slot, the device 210-1 can transmit an AGC in the second symbol. The device 210-1 can also skip the sidelink transmission in a first symbol. The device 210-1 can transmit at least one of data or control information for the sidelink transmission from a third symbol in the sidelink slot.

In other embodiments, if the device 210-1 performs the LBT within a first symbol in the sidelink slot, the device 210-1 can transmit an automatic gain control symbol after an end position of the listen-before-talk. The device 210-1 can transmit at least one of data or control information for the sidelink transmission from a third symbol in the sidelink slot. Alternatively, the device 210-1 can transmit at least one of data or control information for the sidelink transmission from a second symbol in the sidelink slot. In case, the device 210-1 can skip the sidelink transmission in a symbol prior to the guard symbol in the sidelink slot.

In some embodiments, if the device 210-1 performs the LBT within a second symbol in the sidelink slot, the device 210-1 can delay the sidelink transmission by a predetermined time-offset. The predetermined time-offset can be any suitable value.

In some embodiments, the device 210-1 can determine a further target transmission starting position from the set of candidate transmission starting positions in a further sidelink slot for a further sidelink transmission to be performed. The further target transmission starting position can have a higher priority than that of the target transmission starting position. In other embodiments, the device 210-1 can determine a set of primary resources and a set of secondary resources. If the sidelink transmission on the set of primary resources is failed, the device 210-1 can perform a sidelink retransmission on the set of secondary resources.

In some example embodiments, a first apparatus capable of performing any of the method 1300 (for example, the first device) may comprise means for performing the respective operations of the method 1300. The means may be implemented in any suitable form. For example, the means may be implemented in a circuitry or software module. The first apparatus may be implemented as or included in the first device. In some example embodiments, the means may comprise at least one processor and at least one memory including computer program code. The at least one memory and computer program code are configured to, with the at least one processor, cause performance of the apparatus.

In some embodiments, the apparatus comprises means for determining, at a first device, a target transmission starting position from a set of candidate transmission starting positions in a sidelink slot based on an access level of a sidelink transmission to be performed; means for performing a listen-before-talk on a sidelink channel before the target transmission starting position; and means for in accordance with a determination that the listen-before-talk is successful, performing the sidelink transmission from the target transmission starting position.

In some embodiments, the means for determining the target transmission starting position comprises: means for determining the access level based on a transmission type of the sidelink transmission; and means for selecting, from the set of candidate transmission starting positions, the target transmission starting position which is mapped to the access level.

In some embodiments, the means for determining the access level based on the transmission type comprises: means for determining the access level that has a first priority higher than a first priority threshold, in accordance with a determination that the transmission type is one of: an on-going sidelink semi-persistent scheduling transmission, or a retransmission indicated in a previous sidelink transmission; and wherein the means for selecting the target position comprises: means for selecting the target transmission starting position that is an earliest one in time in the set of candidate transmission starting positions.

In some embodiments, the means for determining the access level based on the transmission type comprises: means for determining the access level that has a second priority lower than a first priority threshold and higher than a second priority threshold, in accordance with a determination that the transmission type is one of an on-going sidelink semi-persistent scheduling transmission with a fourth priority lower than a fourth priority threshold, a retransmission indicated in a previous sidelink transmission with a fifth priority lower than a fifth priority threshold, a sidelink semi-persistent scheduling establishment, an one time transmission with control signaling, or an one-time transmission with a requirement of quality of service higher than a threshold; and wherein the means for selecting the target transmission starting position comprises: means for selecting the target transmission starting position that is later in time than the earliest one in time in the set of candidate transmission starting positions.

In some embodiments, the means for determining the access level based on the transmission type comprises: means for determining the access level that has a third priority lower than a third priority threshold, in accordance with a determination that the transmission type is one of: an on-going sidelink semi-persistent scheduling transmission with a fourth priority lower than a fourth priority threshold, a retransmission indicated in a previous sidelink transmission with a fifth priority lower than a fifth priority threshold, an one-time transmission with a requirement of quality of service lower than a threshold; and wherein the means for selecting the target transmission starting position comprises: means for selecting the target transmission starting position that is later in time than the earliest one in time in the set of candidate transmission starting positions in time.

In some embodiments, the means for performing the listen-before-talk comprises: means for completing the listen-before-talk before or on the target transmission starting point; means for, the means for performing the sidelink transmission comprises: means for in accordance with a determination that the target transmission starting point is within a first symbol in the sidelink slot, transmitting a cyclic prefix of the sidelink transmission in a remaining portion of the first symbol; and means for transmitting, to the second device, at least one of data or control information for the sidelink transmission from a second symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a guard symbol of a further sidelink slot prior to the sidelink slot, transmitting an automatic gain control symbol after an end position of the listen-before-talk; and means for transmitting, to the second device, at least one of data or control information for the sidelink transmission from a second symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a first symbol the sidelink slot, transmitting an automatic gain control in a first symbol in the sidelink slot; and means for transmitting, to the second device, at least one of data or control information for the sidelink transmission from a second symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a first symbol in the sidelink slot, transmitting an automatic gain control symbol in the first symbol and a second symbol in the sidelink slot; and means for transmitting, to the second device, at least one of data or control information for the sidelink transmission from a third symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a second symbol in the sidelink slot, skipping the sidelink transmission in a first symbol; means for transmitting an automatic gain control symbol in a second symbol; and means for transmitting, to the second device, at least one of data or control information for the sidelink transmission from a third symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a first symbol in the sidelink slot, transmitting an automatic gain control symbol after an end position of the listen-before-talk; and means for transmitting, to the second device, at least one of data or control information for the sidelink transmission from a third symbol in the sidelink slot.

In some embodiments, the means for performing the listen-before-talk comprises: means for completing the listen-before-talk before or on the target transmission starting point; the means for performing the sidelink transmission comprises: means for in accordance with a determination that the target transmission starting point is within a first symbol in the sidelink slot, transmitting an automatic gain control symbol after an end position of the listen-before-talk; means for transmitting, to the second device, at least one of data or control information for the sidelink transmission from a second symbol in the sidelink slot; and means for skipping the sidelink transmission in a symbol prior to the guard symbol in the sidelink slot.

In some embodiments, the means for performing the listen-before-talk comprises: means for completing the listen-before-talk before or on the target transmission starting point; the means for performing the sidelink transmission comprises: means for delaying the sidelink transmission by a predetermined time-offset.

In some embodiments, the apparatus comprises means for determining a further target position from the set of candidate positions in a further sidelink slot for a further sidelink transmission to be performed, the further target position having a higher priority than that of the target position;

In some embodiments, the apparatus comprises means for determining a set of primary resources; means for determining a set of secondary resources; means for in accordance with a determination that the sidelink transmission on the set of primary resources is failed, performing a sidelink retransmission on the set of secondary resources.

Figure 14:
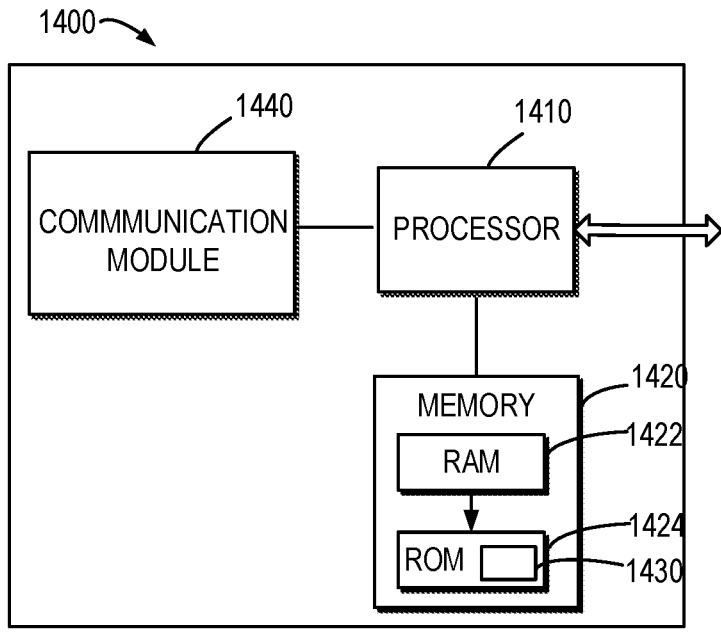
FIG. 14 illustrates a simplified block diagram of an apparatus that is suitable for implementing example embodiments of the present disclosure.

FIG. 14 is a simplified block diagram of a device 1400 that is suitable for implementing example embodiments of the present disclosure. The device 1400 may be provided to implement a communication device, for example, the device 210 as shown in FIG. 2. As shown, the device 1400 includes one or more processors 1410, one or more memories 1420 coupled to the processor 1410, and one or more communication modules 1440 coupled to the processor 1410.

The communication module 1440 is for bidirectional communications. The communication module 1440 has one or more communication interfaces to assist with communication with one or more other modules or devices. The communication interfaces may represent any interface that is necessary for communication with other network elements. In some example embodiments, the communication module 1440 may include at least one antenna.

The processor 1410 may be of any type suitable to the local technical network and may include one or more of the following: general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

The memory 1420 may include one or more non-volatile memories and one or more volatile memories. Examples of the non-volatile memories include, but are not limited to, a Read Only Memory (ROM) 1424, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1422 and other volatile memories that will not last in the power-down duration.

A computer program 1430 includes computer executable instructions that are executed by the associated processor 1410. The program 1430 may be stored in the memory, e.g., ROM 1424. The processor 1410 may perform any suitable actions and processing by loading the program 1430 into the RAM 1422.

Example embodiments of the present disclosure may be implemented by means of the program 1430 so that the device 1400 may perform any process of the disclosure as discussed with reference to FIGS. 3 to 13. The example embodiments of the present disclosure may also be implemented by hardware or by a combination of software and hardware.

Figure 15:
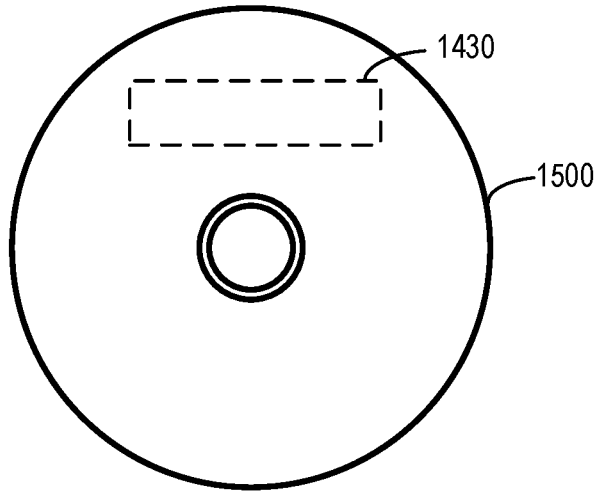
FIG. 15 illustrates a block diagram of an example computer readable medium in accordance with some example embodiments of the present disclosure.

In some example embodiments, the program 1430 may be tangibly contained in a computer readable medium which may be included in the device 1400 (such as in the memory 1420) or other storage devices that are accessible by the device 1400. The device 1400 may load the program 1430 from the computer readable medium to the RAM 1422 for execution. The computer readable medium may include any types of tangible non-volatile storage, such as ROM, EPROM, a flash memory, a hard disk, CD, DVD, and other magnetic storage and/or optical storage. FIG. 15 shows an example of the computer readable medium 1500 in form of an optical storage disk. The computer readable medium has the program 1430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;

the at least one memory and the computer program codes are configured to, with the at least one processor, cause the first device to:
determine a target transmission starting position from a set of candidate transmission starting positions in a sidelink slot based on an access level of a sidelink transmission to be performed;
perform a listen-before-talk on a sidelink channel before the target transmission starting position; and
in accordance with a determination that the listen-before-talk is successful, perform the sidelink transmission from the target transmission starting position.

2. The first device of claim 1, wherein the at least one memory and the computer program code are configured to, with the at least one processor, cause the first device to determine the target transmission starting position by:
determining the access level based on a transmission type of the sidelink transmission; and
selecting, from the set of candidate transmission starting positions, the target transmission starting position which is mapped to the access level.

3. The first device of claim 2, wherein the at least one memory and the computer program code are configured to, with the at least one processor, cause the first device to determine the access level based on the transmission type by:
determining the access level that has a first priority higher than a first priority threshold, in accordance with a determination that the transmission type is one of:
an on-going sidelink semi-persistent scheduling transmission, or
a retransmission indicated in a previous sidelink transmission; and
wherein the at least one memory and the computer program code are configured to, with the at least one processor, cause the first device to select the target position by:
selecting the target transmission starting position that is an earliest one in time in the set of candidate transmission starting positions.

4. The first device of claim 2, wherein the at least one memory and the computer program code are configured to, with the at least one processor, cause the first device to determine the access level based on the transmission type by:
determining the access level that has a second priority lower than a first priority threshold and higher than a second priority threshold, in accordance with a determination that the transmission type is one of:
an on-going sidelink semi-persistent scheduling transmission with a fourth priority lower than a fourth priority threshold,
a retransmission indicated in a previous sidelink transmission with a fifth priority lower than a fifth priority threshold,
a sidelink semi-persistent scheduling establishment,
an one time transmission with control signaling, or
an one-time transmission with a requirement of quality of service higher than a threshold; and
wherein the at least one memory and the computer program code are configured to, with the at least one processor, cause the first device to select the target transmission starting position by:
selecting the target transmission starting position that is later in time than the earliest one in time in the set of candidate transmission starting positions.

5. The first device of claim 2, wherein the at least one memory and the computer program code are configured to, with the at least one processor, cause the first device to determine the access level based on the transmission type by:

determining the access level that has a third priority lower than a third priority threshold, in accordance with a determination that the transmission type is one of:

an on-going sidelink semi-persistent scheduling transmission with a fourth priority lower than a fourth priority threshold, a retransmission indicated in a previous sidelink transmission with a fifth priority lower than a fifth priority threshold, an one-time transmission with a requirement of quality of service lower than a threshold; and wherein the at least one memory and the computer program code are configured to, with the at least one processor, cause the first device to select the target transmission starting position by:

selecting the target transmission starting position that is later in time than the earliest one in time in the set of candidate transmission starting positions in time.

6. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a first symbol in the sidelink slot, transmitting a cyclic prefix of the sidelink transmission in a remaining portion of the first symbol; and transmitting, to a second device, at least one of data or control information for the sidelink transmission from a second symbol in the sidelink slot.

7. The first device of claim 1, wherein the at least one memory and the computer program code are configured to, with the at least one processor, cause the first device to perform the sidelink transmission by completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a guard symbol of a further sidelink slot prior to the sidelink slot, transmitting an automatic gain control symbol after an end position of the listen-before-talk; and transmitting, to a second device, at least one of data or control information for the sidelink transmission from a second symbol in the sidelink slot.

8. The first device of claim 1, wherein the at least one memory and the computer program code are configured to, with the at least one processor, cause the first device to perform the sidelink transmission by completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a first symbol the sidelink slot, transmitting an automatic gain control symbol after an end position of the listen-before-talk; and transmitting, to a second device, at least one of data or control information for the sidelink transmission from a second symbol in the sidelink slot.

9. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a first symbol in the sidelink slot, transmitting an automatic gain control symbol in the first symbol and a second symbol in the sidelink slot; and transmitting, to a second device, at least one of data or control information for the sidelink transmission from a third symbol in the sidelink slot.

10. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a second symbol in the sidelink slot, skipping the sidelink transmission in a first symbol;

transmitting an automatic gain control symbol in a second symbol; and transmitting, to a second device, at least one of data or control information for the sidelink transmission from a third symbol in the sidelink slot.

11. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a first symbol in the sidelink slot, transmitting an automatic gain control symbol after an end position of the listen-before-talk; and transmitting, to a second device, at least one of data or control information for the sidelink transmission from a third symbol in the sidelink slot.

12. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

in accordance with a determination that the target transmission starting point is within a first symbol in the sidelink slot, transmitting an automatic gain control symbol after an end position of the listen-before-talk;

transmitting, to a second device, at least one of data or control information for the sidelink transmission from a second symbol in the sidelink slot; and skipping the sidelink transmission in a symbol prior to the guard symbol in the sidelink slot.

13. The first device of claim 1, wherein the at least one memory and the computer program code are configured to, with the at least one processor, cause the first device to perform the listen-before-talk by:

completing the listen-before-talk before or on the target transmission starting point;

wherein the at least one memory and the computer program code are configured to, with the at least one processor, cause the first device to perform the sidelink transmission by:

delaying the sidelink transmission by a predetermined time-offset.

14. The first device of claim 1, wherein the at least one memory and the computer program code are configured to, with the at least one processor, cause the first device to:

determine a further target position from the set of candidate positions in a further sidelink slot for a further sidelink transmission to be performed, the further target position having a higher priority than that of the target position.

15. The first device of claim 1, wherein the at least one memory and the computer program code are configured to, with the at least one processor, cause the first device to:

determine a set of primary resources;

determine a set of secondary resources;

in accordance with a determination that the sidelink transmission on the set of primary resources is failed, perform a sidelink retransmission on the set of secondary resources.

16. A method, comprising:

determining, at a first device, a target transmission starting position from a set of candidate transmission starting positions in a sidelink slot based on an access level of a sidelink transmission to be performed;

performing a listen-before-talk on a sidelink channel before the target transmission starting position; and in accordance with a determination that the listen-before-talk is successful, performing the sidelink transmission from the target transmission starting position.

17. The method of claim 16, wherein determining the target transmission starting position comprises:

determining the access level based on a transmission type of the sidelink transmission; and selecting, from the set of candidate transmission starting positions, the target transmission starting position which is mapped to the access level.

18. The method of claim 17, wherein determining the access level based on the transmission type comprises:

determining the access level that has a first priority higher than a first priority threshold, in accordance with a determination that the transmission type is one of:

an on-going sidelink semi-persistent scheduling transmission, or a retransmission indicated in a previous sidelink transmission; and wherein selecting the target position comprises:

selecting the target transmission starting position that is an earliest one in time in the set of candidate transmission starting positions.

19. The method of claim 17, wherein determining the access level based on the transmission type comprises:

determining the access level that has a second priority lower than a first priority threshold and higher than a second priority threshold, in accordance with a determination that the transmission type is one of:

an on-going sidelink semi-persistent scheduling transmission with a fourth priority lower than a fourth priority threshold, a retransmission indicated in a previous sidelink transmission with a fifth priority lower than a fifth priority threshold, a sidelink semi-persistent scheduling establishment, an one time transmission with control signaling, or an one-time transmission with a requirement of quality of service higher than a threshold; and wherein selecting the target transmission starting position comprises:

selecting the target transmission starting position that is later in time than the earliest one in time in the set of candidate transmission starting positions.

20. The method of claim 17, wherein determining the access level based on the transmission type comprises:

determining the access level that has a third priority lower than a third priority threshold, in accordance with a determination that the transmission type is one of:

an on-going sidelink semi-persistent scheduling transmission with a fourth priority lower than a fourth priority threshold, a retransmission indicated in a previous sidelink transmission with a fifth priority lower than a fifth priority threshold, an one-time transmission with a requirement of quality of service lower than a threshold; and wherein selecting the target transmission starting position comprises:

selecting the target transmission starting position that is later in time than the earliest one in time in the set of candidate transmission starting positions in time.

\* \* \* \* \*